United States Patent [19]

Brooks et al.

[11] 4,256,996
[45] Mar. 17, 1981

[54] WEB TRANSPORT SYSTEM

[75] Inventors: Steven W. Brooks, Pamona; John M. Favrou, Del Mar, both of Calif.

[73] Assignee: Spin Physics, Inc., San Diego, Calif.

[21] Appl. No.: 7,282

[22] Filed: Jan. 29, 1979

[51] Int. Cl.³ .................. B65H 59/38; H02P 5/50
[52] U.S. Cl. .................. 318/7; 242/75.51; 242/186
[58] Field of Search .......... 318/4, 5, 6, 7, 8, 87, 318/362, 433; 242/75.51, 186, 191; 360/73, 74.3

[56] References Cited
U.S. PATENT DOCUMENTS

| | | | |
|---|---|---|---|
| 3,733,529 | 5/1973 | Ross et al. | 242/186 |
| 3,805,127 | 4/1974 | Svendsen | 318/7 |
| 3,863,117 | 1/1975 | Paschetto | 318/7 |
| 3,921,043 | 11/1975 | Luzio | 318/7 |
| 3,926,513 | 12/1975 | Silver et al. | 318/7 |
| 4,051,415 | 9/1977 | Martin | 318/7 |
| 4,095,146 | 6/1978 | Spaman et al. | 318/7 |

*Primary Examiner*—Stanley J. Witkowski
*Assistant Examiner*—John W. Redman
*Attorney, Agent, or Firm*—Robert F. Cody

[57] ABSTRACT

A capstanless magnetic tape transport system employs supply and take-up motors, the supply motor being employed as a drag motor. The supply motor is controlled to meter tape at a predetermined speed, and the take-up motor is of such design that, in response to a constant voltage applied thereto, it provides constant tension to the tape being metered.

6 Claims, 4 Drawing Figures

WEB TRANSPORT SYSTEM

BACKGROUND OF THE INVENTION

1. Field of the Invention

This invention relates in general to web transport systems and, in particular, to a capstanless transport system for use in metering a web, such as magnetic tape, at constant speed and constant tension.

2. Description Relative to the Prior Art

What is perhaps the most relevant prior art for the present invention is the disclosure of U.S. Pat. No. 3,733,529, issued May 15, 1973, and the corresponding publications "Reel-to-Reel Drive Design for a Cassette Recorder" and "Audio Cassettes Become Digital with Novel Reel-to-Reel Drive" appearing in "Computer Design" of August, 1973, and in a trade publication, respectively. U.S. Pat. No. 3,733,529 teaches, in a capstanless magnetic tape transport system employing take-up and supply motors for driving, respectively, take-up and supply reels, the generation of a control signal corresponding to $$\frac{\omega_1 \omega_2}{\sqrt{\omega_1^2 + \omega_2^2}},$$

where $\omega_1$ and $\omega_2$ represent the speeds of the take-up and supply motors, respectively. The signal $$\frac{\omega_1 \omega_2}{\sqrt{\omega_1^2 + \omega_2^2}},$$

as taught in the patent, is equated with a signal representing a constant tape speed, the error therebetween being used to control the speed of the system 'take-up' motor. Tape tension is maintained by applying to the supply motor a calculated variable "drag" signal that decreases with increasing supply motor speed. By virtue of the teaching of U.S. Pat. No. 3,733,529 the following system performance characteristics have been obtained, as noted in the publication "Audio Cassettes Become Digital With Novel Reel-to-Reel Drive":
(1) tape tension—±0.75 oz.
(2) tape speed variation—±5%
(3) flutter—3%.

SUMMARY OF THE INVENTION

Whereas the above-referenced prior art regulates 'take-up' by means of the indicated speed control signal, the invention, in a capstanless tape transport system employing take-up and supply motors, employs that same speed control signal to regulate the 'supply' motor drag for tape speed control, employing for take-up a motor having a torque-speed characteristic that corresponds to a constant for the product of take-up torque and speed. Such a technique enables a five-times increase in tape speed accuracy, a six-times improvement in flutter, and a one and one-half-times increase in tension regulation over such a prior art.

The invention will be further described with reference to the figures, wherein.

Before addressing specific hardware, the following analysis is presented in the interest of clarifying the workings of the invention:

In a capstanless tape transport system employing a take-up motor and a supply (drag) motor for driving, respectively, take-up and supply reels, constant tape speed requires reel angular velocities $\omega$ to be inversely proportional to respective tape pack diameters D . . .

$$\omega \approx 1/D$$

Also, for constant tape tension, the torques T of the motors must vary directly in proportion to respective tape pack diameters . . .

$$T \approx D$$

Figure 1:
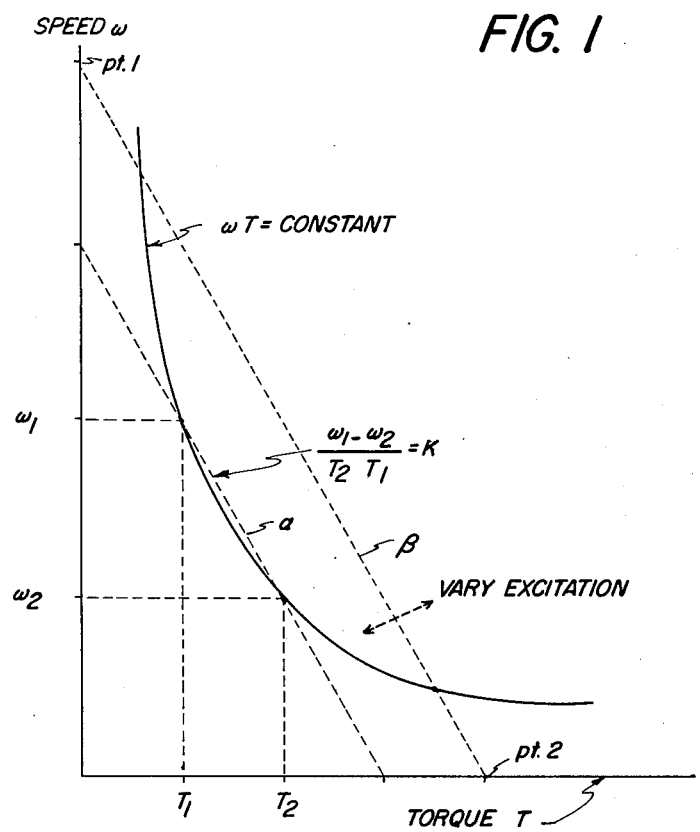
FIG. 1 depicts a torque-speed curve used in the practice of the invention.

Thus, for constant tape speed and tension, a torque-speed characteristic of $$\omega T = \text{constant}$$

results, and is plotted as a solid line in FIG. 1. Given such plot, it is a prime concept of the invention to select a take-up motor having a corresponding torque-speed characteristic, whereby by use of an appropriate supply motor drag control for maintaining constant tape speed, the take-up motor will inherently be forced to an appropriate speed, with complementary torque for constant tape tension. (In other words, the supply motor drag effectively sets the speed of the take-up motor for constant tape speed, and the take-up motor inherently provides the proper amount of torque for constant tape tension.)

To identify a motor having a torque-speed characteristic that matches the "solid line" curve of FIG. 1, consider the following:

Given empty and full reel speeds of $\omega_1$ and $\omega_2$, the requisite torques at those speeds for the take-up motor will be $T_1$ and $T_2$, respectively. Thus, the slope K of the dashed line $\alpha$ closely approximates the slope of the ideal torque-speed curve within the operating range of interest. Such a slope, in the case of a permanent magnet DC motor, corresponds to the ratio of the motor free-running speed divided by its stall torque. By selecting, for purposes of take-up, a permanent magnet DC motor with the appropriate ratio of free-running speed (point 1, FIG. 1) to stall torque (point 2, FIG. 1) . . . i.e. a motor having a torque-speed curve such as curve $\beta$ . . . and suitably adjusting the excitation of the take-up motor, take-up as per the dashed line curve $\alpha$ of FIG. 1 will occur.

Figure 2:
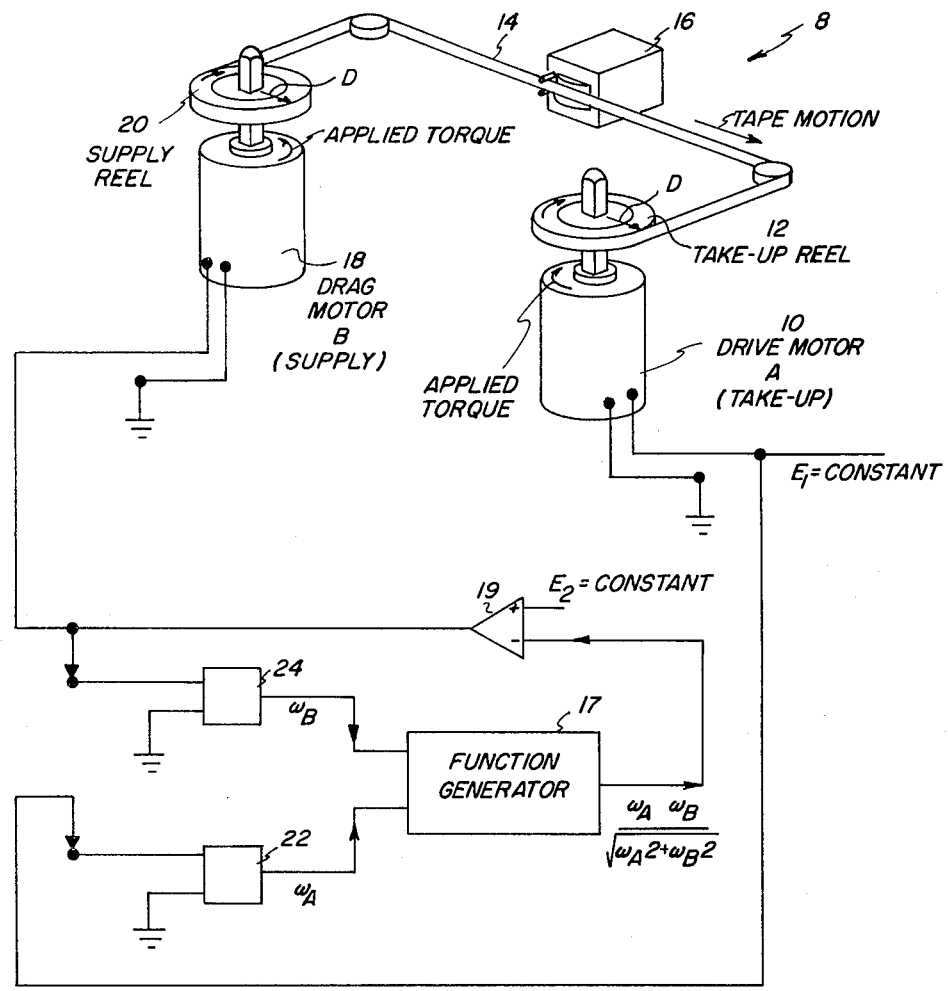
FIG. 2 is a schematic block diagram of a tape transport system employing the invention.

Referring now to FIG. 2, a tape transport system 8 according to one embodiment of the invention employs a permanent magnet take-up motor 10 which rotates a tape pack 12 so as to pull tape 14 past a record/play head 16. The take-up motor 10 is one having a torque-speed characteristic the slope of which substantially matches the slope of the curve that corresponds to the product of tape pack torque multiplied by tape pack rotary speed when the tape 14 is run at predetermined constant speed and tension. By suitably metering the tape 14 to the tape pack 12 so that the tape 14 has a predetermined constant linear speed, the take-up motor 10, to which a constant voltage $E_1$ is applied, inherently adjusts its torque to keep the tape tension constant.

To assure proper metering of tape at the predetermined constant speed, the invention in a presently preferred form thereof provides a speed control signal $$\frac{\omega_A \omega_B}{\sqrt{\omega_A^2 + \omega_B^2}}$$

(derived by conventional means 17 from the rotary speeds $\omega_A$, $\omega_B$ of the take-up and supply motors, as taught in U.S. Pat. No. 3,733,529) and equates such signal (difference circuit 19) with a reference tape speed signal, $E_2$, to produce an error signal for so controlling the "drag" of a supply motor 18 that the tape 14, fed from a supply tape pack 20, is metered out at constant tape speed. As in the teaching of U.S. Pat. No. 3,733,529, signals corresponding to the rotary speeds $\omega_A$, $\omega_B$ of the take-up and supply motors 10, 18, respectively, may be provided by a variety of "tachometer" techniques such, for example, as detecting—via bridge circuits 22, 24—the back electromotive forces (emf's) of the motors in question.

It will be appreciated that, whereas the teaching of U.S. Pat. No. 3,733,529 calls for the application of the output of the difference circuit 19 to "drive" the take-up motor 10, the present invention calls for the application of the output of the difference circuit 19 to "drag" the supply motor 18 ... the take-up motor 10, by virtue of its specific torque-speed characteristic, being free-running save for the reining which it experiences from the supply motor drag. Use of the invention as disclosed above has resulted in the following performance data:
(1) tape tension variation—$\pm 0.5$ oz.
(2) tape speed variation—$\pm 1.0\%$
(3) flutter—0.5%
which, it will be appreciated, is a significant improvement over the published performance data of the system of U.S. Pat. No. 3,733,529.

Figure 3:
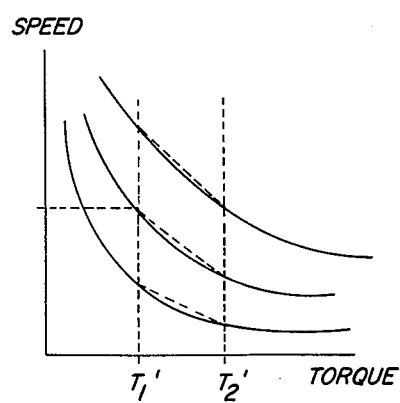
FIG. 3 shows a family of curves useful in describing another embodiment of the invention.

Reference should now be had to FIG. 3 which depicts a family of torque-speed curves for a transport system as in FIG. 2, assuming variable tape speed while keeping tape tension constant. Although each such curve in the family is a rectangular hyperbola, all such curves have shapes characteristic of given, but different, constant tape speeds. With tape packs of certain predetermined sizes, the empty and full reel torques which will be required, regardless of tape speed, will be as defined by the FIG. 3 dashed lines associated with the limits $T'_1$, $T'_2$. Since the slope of each of the curves is different between the $T'_1$, $T'_2$ limits, it is apparent that use of a permanent magnet motor as taught above is only practical for a system characteristic of a single tape speed. This is so because of the fact that varying the excitation of a permanent magnet motor has the effect of "shifting orthogonally" the torque-speed curve for such a motor ... which is to say that there is only one good match between the slope of a permanent magnet motor torque-speed curve and the required system torque-speed parameters. ("Orthogonal shifting" is reflected in the starred notation of FIG. 1.)

Of the various types of motors which are known, a series-wound DC motor has associated therewith a family of torque-speed curves which is similar to and characteristic of the family of curves of FIG. 3. Thus, it is within the contemplation of the invention to replace the permanent magnet motor 10 of FIG. 2 with a series-wound DC motor, thereby to effect (by suitable excitation) the transport of tape at various predetermined speeds. Permanent magnet and series-wound DC motors are alone practical for take-up according to the invention ... and are generally described, and claimed herein, by and under the expression "motor having a torque-speed relationship substantially corresponding to a constant for the product of motor torque and rotary speed for constant web (tape) tension and rectilinear speed".

Figure 4:
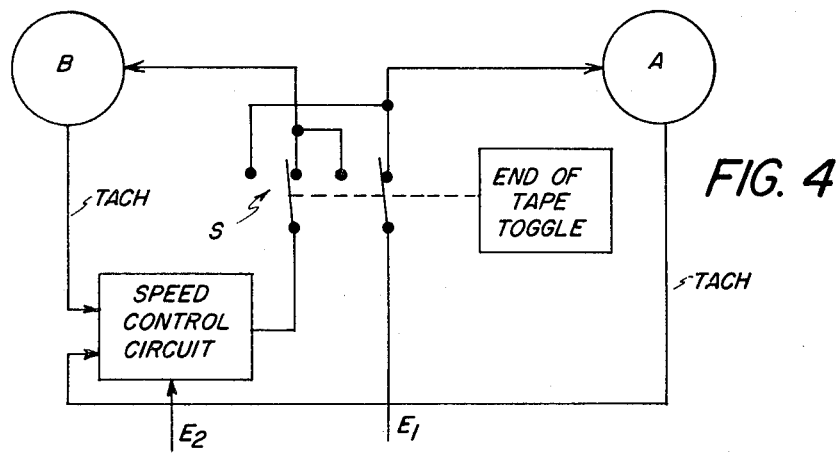
FIG. 4 is a schematic block diagram depicting a presently preferred embodiment of the invention.

For a tape transport system in which the tape is taken up (solely) under control of the motor 10, the design of the supply motor 18 is of little concern, so long as it meters tape at the predetermined tape speed. In the event, however, that the transport system is to be a reversible one, e.g. one in which the motors 10, 18 switch their respective functions, it is essential that both motors be selected, for example, as taught in connection with FIG. 1. For a tape transport in which the tape is to move first one way, then the opposite way, but always at constant speed, the motors 10, 18 would preferably be identical. (See FIG. 4 in which the motors A, B are identical and in which a switch S is provided for converting, at end-of-tape, the normal take-up motor A to a supply motor, and for converting the normal supply motor B to a take-up motor, the speed control for regulating the "supply motor" and the signal $E_1$ being both switched at that time.) For a tape transport in which the tape is to move first one way at one speed, then in the opposite way at a different speed, both motors would have to be selected as taught, for example, in connection with FIG. 1 (i.e. each motor would have to have a torque-speed relationship corresponding to a desired constant tape speed at constant tape tension) and the control voltages $E_1$, $E_2$ would have to be selected accordingly.

The invention has been described in detail with particular reference to certain preferred embodiments thereof, but it will be understood that variations and modifications can be effected within the spirit and scope of the invention.

What is claimed is:
1. Web transport apparatus comprising:
   (a) means for metering a web at a substantially constant rectilinear web speed,
   (b) an electric take-up motor cooperative with said web for winding said web into a rolled pack thereof, said electric motor being a type motor having a torque-speed relationship substantially corresponding to a constant for the product of motor torque and rotary speed for constant web tension and rectilinear speed, and
   (c) means for applying a constant voltage to said electric motor which is such as to put substantially constant tension in said web at any given motor speed said means for metering said web at constant rectilinear speed comprising:
   (a) an electric supply motor, adapted to cooperate with a rolled supply web pack, for metering said web from said pack, and
   (b) means for applying a variable voltage to said motor which is such as to cause said supply motor to apply a drag force to said web, said variable voltage being proportional to the difference between a constant and the quotient of the product of the speeds of said take-up and supply motors divided by the square root of the sum of the squares of such motor speeds.

2. The apparatus of claim 1 wherein said electric supply motor is a type motor having a torque-speed relationship substantially corresponding to a constant for the product of motor torque and rotary speed for constant web tension and rectilinear speed, and wherein said apparatus includes means for removing said constant voltage from said take-up motor and for applying to said take-up motor a variable voltage proportional to the difference between a constant and the quotient of the product of the speeds of said take-up and supply motors divided by the square root of the sum of the squares of such motor speeds, and for applying to said supply motor a constant voltage, whereby said take-up and supply motors reverse their respective functions and reverse the direction of web travel at constant rectilinear speed and tension.

3. The apparatus of claim 2 wherein said supply and take-up motors are substantially identical.

4. A capstanless transport system for transporting magnetic tape at a constant rectilinear speed and constant tension comprising:
   (a) a take-up motor adapted to drive a take-up reel, said take-up motor being a type motor having a torque-speed relationship substantially corresponding to a constant for the product of motor torque and rotary speed for constant tape tension and rectilinear speed,
   (b) a supply motor adapted to drive a supply reel, said magnetic tape being adapted to extend between and be wound on said reels,
   (c) means for applying a constant voltage to said take-up motor which is such as to create constant tension in said tape when said tape is transported at said constant rectilinear speed, and
   (d) means for applying a variable voltage to said supply motor to apply a drag force to said tape, said variable voltage being such as to cause said supply motor to meter said tape from said supply reel at said constant rectilinear tape speed said means for applying said variable voltage to said supply motor comprising:
   (a) means for producing signals $\omega_A$ and $\omega_B$ corresponding to the speeds of said take-up and supply motors respectively,
   (b) means for producing a signal representing a constant, and
   (c) means responsive to the signals $\omega_A$, $\omega_B$ and to said constant-representative signal for producing a variable motor control signal corresponding to the difference between said constant and the quotient of the product of the signals $\omega_A$ and $\omega_B$ divided by the square root of the sum of the squares of the signals $\omega_A$ and $\omega_B$, said motor control signal being applied to said supply motor.

5. The apparatus of claim 4 wherein said take-up motor is a series-wound DC motor.

6. The apparatus of claim 4 wherein said take-up motor is a permanent magnet motor.

* * * * *